(No Model.)

P. M. DONAHOO.
HORSE CLEANER.

No. 573,579. Patented Dec. 22, 1896.

WITNESSES
F. B. Berry.
J. C. Tappan

INVENTOR,
Patrick M. Donahoo,
by John Wedderburn.
Attorney

UNITED STATES PATENT OFFICE.

PATRICK M. DONAHOO, OF PLATTEVILLE, WISCONSIN, ASSIGNOR OF ONE-THIRD TO JOHN C. DONAHOO, OF CUBA CITY, WISCONSIN.

HORSE-CLEANER.

SPECIFICATION forming part of Letters Patent No. 573,579, dated December 22, 1896.

Application filed September 1, 1896. Serial No. 604,550. (No model.)

*To all whom it may concern:*

Be it known that I, PATRICK M. DONAHOO, a citizen of the United States, residing at Platteville, in the county of Grant and State of Wisconsin, have invented certain new and useful Improvements in Horse-Cleaners; and I do hereby declare the following to be a full, clear, and exact description of the invention, such as will enable others skilled in the art to which it appertains to make and use the same.

My invention relates to improvements in horse-cleaners, the object of the same being to provide a simple and cheaply-constructed device whereby mud may be quickly and readily removed from the limbs of horses and other animals without danger of abrading the skin and producing sores.

The invention consists of a band of canvas or other suitable fabric, having ribs on each side thereof and handles on each end.

The invention is clearly illustrated in the accompanying drawings, in which—

Figure 1:
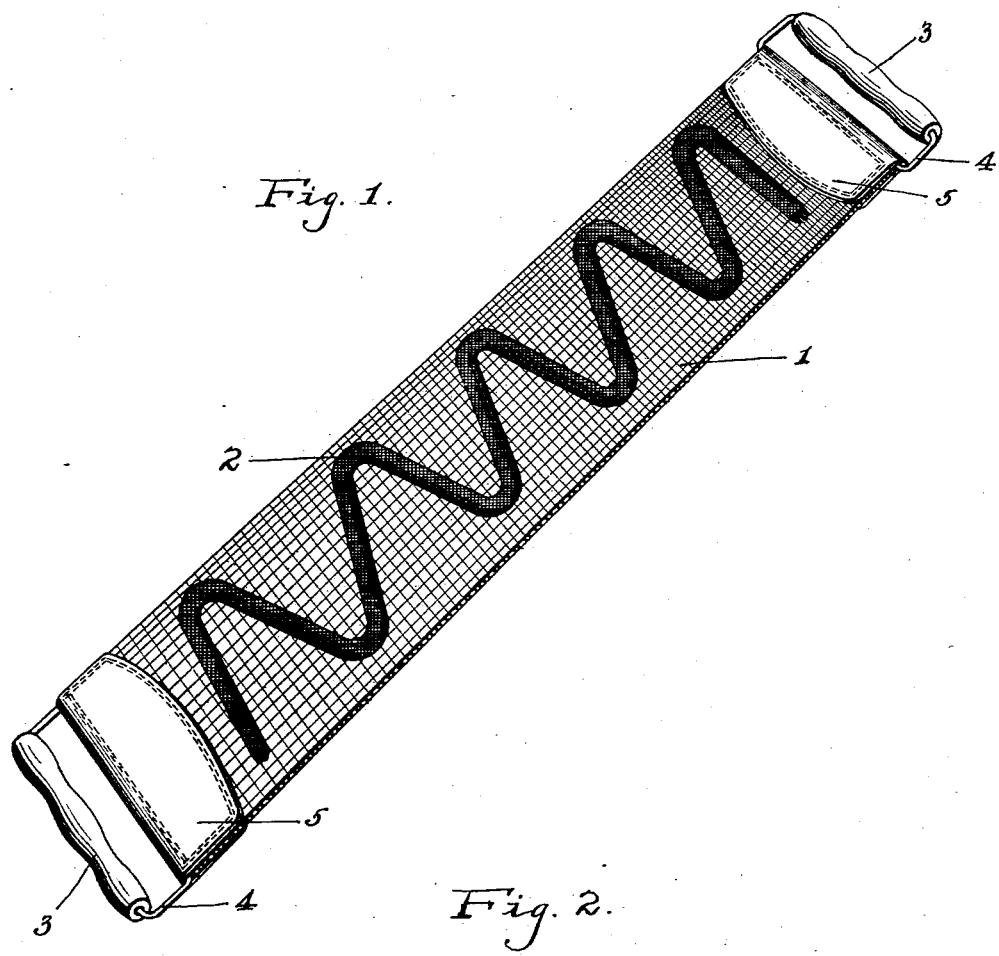
Figure 2:
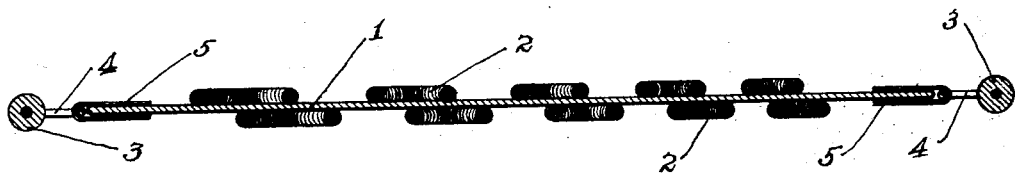

Figure 1 represents a perspective view of my improved horse-cleaner. Fig. 2 is a longitudinal section through the same.

Like reference-numerals indicate like parts in the different views.

My improved device is made up of a band 1 of canvas or other suitable fabric, having ribs 2 2 on each side thereof. The said ribs are preferably formed of cords or rope bent into a series of loops, the folds thereof constituting the ribs. At each end of the band 1 are secured handles 3 3, the same being preferably mounted to turn upon the end of wire loops 4, which are held in place upon the ends of said band by leather strips 5 5, sewed or otherwise secured to said band.

In using my device the band 1 is passed around the leg of the horse and the device grasped by the two handles 3 3. A backward and forward movement of the band will bring the ribs 2 in close contact with the mud or other foreign substance on the horse's leg and quickly remove the same without danger of abrasion.

Having now described my invention, what I claim as new, and desire to secure by Letters Patent, is—

1. A horse-cleaner consisting of a band of canvas or other suitable fabric, ribs of soft material on the sides of said band, and handles at each end thereof.

2. A horse-cleaner consisting of a band of canvas or other suitable fabric, ribs on each side thereof formed by looped strips of cord or rope, and handles secured to each end of said band, mounted to turn upon strips of wire which are themselves secured in place by strips of leather sewed or otherwise attached to said band.

In testimony whereof I have signed this specification in the presence of two subscribing witnesses.

PATRICK M. DONAHOO.

Witnesses:
  LOUIS THOMAS,
  R. A. WATKINS.